Figure 1:
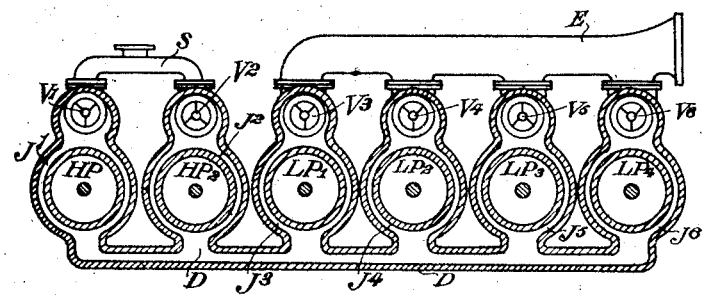

W. J. STILL.
MULTICYLINDER INTERNAL COMBUSTION ENGINE.
APPLICATION FILED MAY 19, 1919.

1,324,183.

Patented Dec. 9, 1919.
2 SHEETS—SHEET 1.

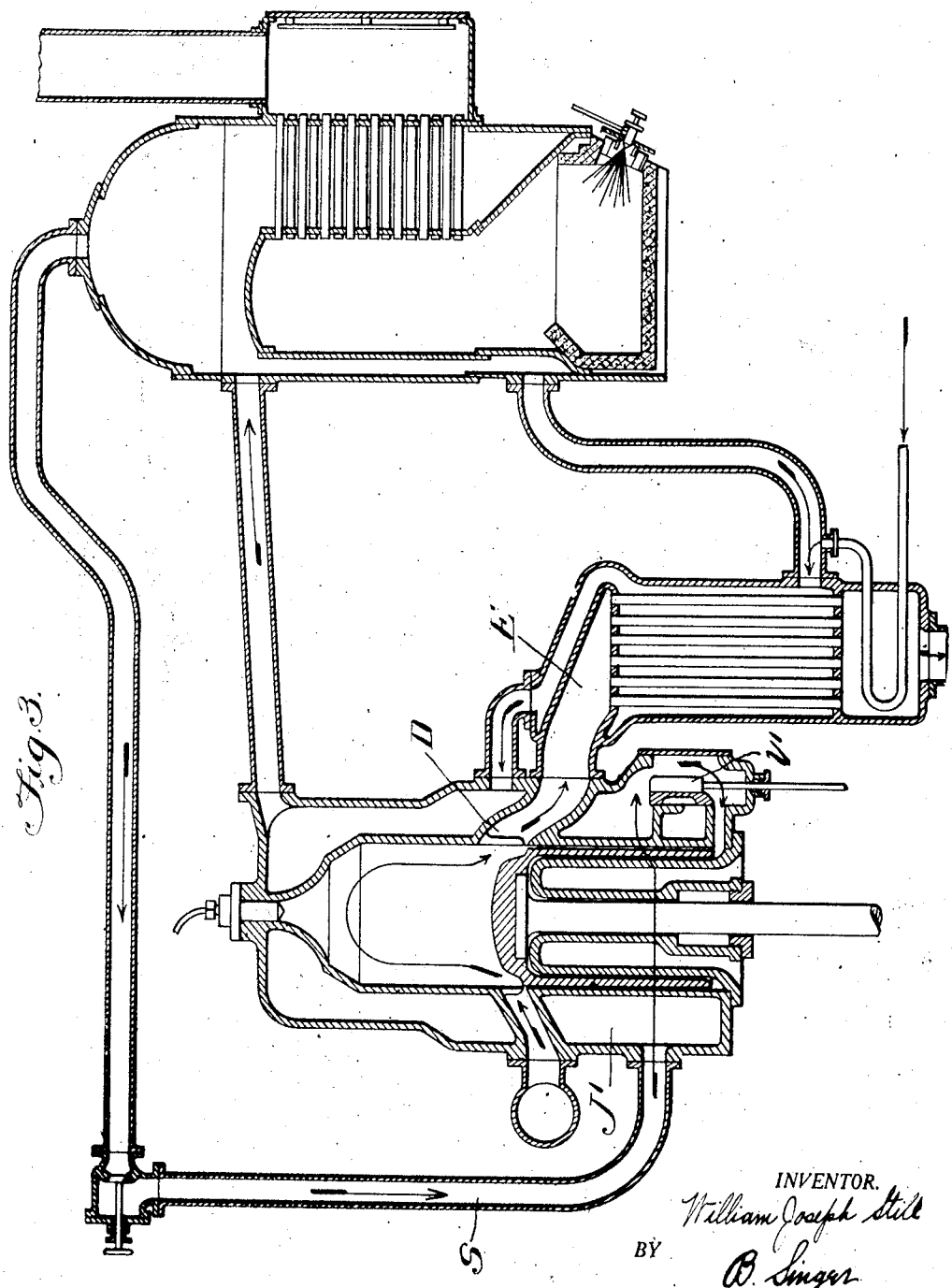

UNITED STATES PATENT OFFICE.

WILLIAM JOSEPH STILL, OF LONDON, ENGLAND.

MULTICYLINDER INTERNAL-COMBUSTION ENGINE.

1,324,183.  Specification of Letters Patent.  Patented Dec. 9, 1919.

Application filed May 19, 1919. Serial No. 298,204.

*To all whom it may concern:*

Be it known that I, WILLIAM JOSEPH STILL, of 7 Princes street, London, S. W. 1., England, engineer, have invented certain new and useful Improvements in Multicylinder Internal-Combustion Engines, of which the following is a specification.

This invention relates to multi-cylinder internal combustion engines of that general character described in the specification of my prior British Letters Patent Nos. 25,356 of 1910 and 28,472 of 1912 where steam generated wholly or in part from heat derived from the cylinder walls and combustion exhaust is utilized at the backs of the combustion engine pistons and operates expansively.

In such engines where it has been proposed hitherto to provide for compound expansion of the steam or the exhaust gases from combustion engine cylinders a special expansion cylinder or cylinders has been provided.

The object of the present invention is to provide an improved means of steam compounding in such engines, and the invention consists in particular arrangements for compounding whereby the steam ends of the combustion engine cylinders alone are used, one or some of them operating as high pressure steam cylinders and another or others essentially providing a greater total volume—as a low pressure steam cylinder or cylinders.

This may be accomplished by providing the combustion engine cylinders of different sizes so that steam utilized at the back of a piston in a cylinder of comparatively small area used as a high pressure cylinder would be exhausted to a cylinder of larger area, but a more convenient arrangement and one which I prefer to adopt is to provide all the cylinders of the same area and utilize one or a number of them as high pressure steam cylinders and a greater number as low pressure steam cylinders.

I propose to provide the steam end or ends of each of the cylinders with a steam jacket which forms a receiver for the steam as the latter leaves or enters the cylinder.

Such a jacket fulfils many useful functions. In the first place, the steam supplied to it heats the ends of the cylinders before the engine is started up as a combustion engine. When the engine is running as a combustion engine it serves to keep the steam cylinder cool and abstracts heat absorbed by the cylinder walls from the piston or pistons. The jackets aforesaid therefor constitute chambers for maintaining comparatively constant pressures in the cylinders. It should be noted, however, that it is not new to introduce steam into jackets surrounding the combustion zone of the cylinders as will be seen upon reference to prior specification No. 25,356 of 1910 before alluded to, steam being introduced into the jackets in this prior case with the object of cooling the cylinder and itself becoming superheated.

Figure 2:
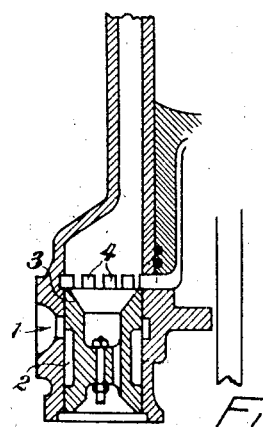

In the accompanying drawings I have illustrated an embodiment of the invention diagrammatically. Figure 1 being a sectional diagram of a six cylinder arrangement, the section being taken transversely of the cylinders, and Fig. 2 is a longitudinal sectional view of the form of valve I propose to employ for controlling the admission and exhaust of the steam to and from the cylinders. Fig. 3 is a vertical sectional view of my improved engine and of a steam boiler to which it is connected.

Referring to these drawings the arrangement shown consists of six cylinders, operating upon the two stroke combustion cycle. The cranks are set equally at 60° apart, the arrangement being such that two of the six cylinders whose cranks are 180° one to the other act as high pressure steam cylinders while the remaining four cylinders constitute the low pressure cylinders.

In the drawings the two high pressure cylinders are designated $HP^1$, $HP^2$ and the low pressure cylinders are designated $LP^1$, $LP^2$, $LP^3$ and $LP^4$. High pressure steam is admitted to the branch pipe S and led to the valve chests of the two high pressure cylinders $HP^1$ and $HP^2$. It is then admitted to the cylinders and exhausted from $HP^1$ and $HP^2$ under control of the valves $V^1$ and $V^2$ as will hereafter more fully appear. The steam is exhausted from the cylinders $HP^1$ and $HP^2$ to the jackets $J^1$ and $J^2$ and by reason of the distributing pipe or duct D this exhaust steam passes to the jackets $J^3$—$J^6$ of the low pressure cylinders $LP^1$—$LP^4$. It is then admitted to and exhausted from the low pressure cylinders $LP^1$—$LP^4$ under control of valves $V^3$—$V^6$ the exhaust being by way of the exhaust pipe E. The valves $V^1$—$V^6$ are all of the same construction but the valves $V^1$ and $V^2$ of the high pressure cylinders have inside admission and outside exhaust to the jackets $J^1$ and $J^2$ while the valves $V^3$—$V^6$ of the low pressure cylinders have outside admission from the jackets and inside exhaust to the exhaust pipe E. This will be readily understood upon reference to Fig. 2 which shows one of the valves in section. In the case of the valves $V^1$ and $V^2$ the steam admission pipe S leads the steam to the port 1 whence it passes to the annular chamber 2 surrounding the piston valve 3 and as the valve operates in accordance with the usual principles with which all engineers are familiar the steam passes through the ports 4 into the cylinder when the piston valve reaches the position shown in dotted lines and exhausts again through these ports 4 to the jacket $J^2$, for instance, and thence by the duct D to the other jackets $J^3$—$J^6$ when the piston valve moves again to the position shown in the drawings. In the case of the valves $V^3$—$V^6$ of the low pressure cylinders $LP^1$—$LP^4$ the reverse is the case. The steam in the jackets passes to the cylinders when their respective valves are in the position shown in full in the drawings and when the piston valve 3 moves to the position shown in dotted lines this steam is exhausted through the port 1 and passes by way of the pipe E to the condenser.

The foregoing arrangement will be found to be very advantageous since it gives the maximum receiver space between the high pressure and low pressure cylinders while also providing for the maximum reheating prior to the use of the steam in the low pressure cylinders. Should this reheating become excessive it can be controlled by providing water chambers at the bottoms of the jackets supplied with boiler water under control of a suitable thermostatic or other valve.

Instead of admitting the high pressure steam directly to the high pressure cylinders such steam may be admitted to the jackets and thence to the high pressure cylinders from which it could be exhausted to the jackets of the low pressure cylinders. In this case it would be necessary to separate the jackets of the high pressure cylinders from those of the low pressure cylinders.

Three cylinder engines can be compounded in accordance with the foregoing principles by expanding from one high pressure cylinder to two low pressure cylinders, and four cylinder sets by expansion from one cylinder to the other three but in this latter case more jacket or receiver space will be required in order to maintain satisfactory steam distribution to the low pressure cylinders than in the former cases. Eight cylinders can be readily compounded from two high pressure to six low pressure cylinders, and in this case the jacket space will be ample to insure the maintenance of satisfactory steam distribution.

What I claim and desire to secure by Letters Patent is:—

1. A multi-cylinder internal combustion engine adapted to operate partially under steam used expansively at the backs of the combustion engine cylinders pistons wherein the steam spaces of one or more of the combustion engine cylinders is or are supplied with high pressure steam and the exhaust steam for these cylinders is used as low pressure steam in another combustion cylinder or cylinders whose total steam space is of greater volume than the total steam space of the cylinder or cylinders to which the high pressure steam is supplied.

2. A multi-cylinder internal combustion engine adapted to operate partially under steam used expansively at the backs of the combustion engine pistons wherein all the cylinders are of the same diameter and have steam spaces of the same volume and one or more of them are supplied with high pressure steam and operate as high pressure steam cylinders and exhaust to a greater number of cylinders which operate as low pressure cylinders and exhaust to atmosphere or a condenser.

3. A multi-cylinder internal combustion engine as claimed in claim 1 in which each cylinder is provided with a jacket into which steam is admitted, means whereby such jackets are in communication with each other and further means whereby the steam supplied to said jacket is subsequently distributed to the cylinders and after expansion in said cylinders is exhausted.

In witness whereof I affix my signature.

WILLIAM JOSEPH STILL.